US010552246B1

(12) United States Patent
Kirmer et al.

(10) Patent No.: US 10,552,246 B1
(45) Date of Patent: Feb. 4, 2020

(54) COMPUTER SYSTEM AND METHOD FOR HANDLING NON-COMMUNICATIVE ASSETS

(71) Applicant: Uptake Technologies, Inc., Chicago, IL (US)

(72) Inventors: Stephanie Kirmer, Chicago, IL (US); Alexander Gutfraind, Chicago, IL (US)

(73) Assignee: Uptake Technologies, Inc., Chicago, IL (US)

(*) Notice: Subject to any disclaimer, the term of this patent is extended or adjusted under 35 U.S.C. 154(b) by 165 days.

(21) Appl. No.: 15/791,545

(22) Filed: Oct. 24, 2017

(51) Int. Cl.
*G06F 11/07* (2006.01)

(52) U.S. Cl.
CPC .................. *G06F 11/079* (2013.01)

(58) Field of Classification Search
CPC .................................... G06F 11/079
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Joseph R Kudirka
(74) *Attorney, Agent, or Firm* — Lee Sullivan Shea & Smith LLP

(57) ABSTRACT

The example systems, methods, and devices disclosed herein generally relate to handling operating data from non-communicative assets. In some instances, a data-analytics platform receives operating data points from a given asset of a plurality of assets. Based on that data, the data-analytics platform detects a communication abnormality at the given asset, in accordance with one or more techniques disclosed herein. In response to detecting the communication abnormality, the data-analytics platform designates the given asset as being non-communicative. The data-analytics platform handles operating data points received from the given asset in accordance with the non-communicative designation.

20 Claims, 9 Drawing Sheets

(56) References Cited

U.S. PATENT DOCUMENTS

| | | | |
|---|---|---|---|
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,627,688 B1 * | 12/2009 | Artz, Jr. | G06Q 10/063 709/234 |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2004/0181712 A1 | 9/2004 | Taniguchi et al. | |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0301246 A1 * | 10/2014 | Mathur | H04M 3/42221 370/259 |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |
| 2015/0046870 A1 | 2/2015 | Goldenberg et al. | |
| 2015/0262060 A1 | 9/2015 | Husain et al. | |
| 2015/0372901 A1 * | 12/2015 | Pacella | H04L 45/28 370/225 |
| 2018/0368683 A1 * | 12/2018 | Hu | G16H 10/40 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

McCune et al. "Detection of Denial-of-Message Attacks on Sensor Network Broadcasts" 2005 IEEE Symposium on Security and Privacy, May 8-11 2005, Carnegie Mellon University, DOI 10.1109/SP.2005.7, 16 pages.

Duche, Ravindra Navanath and Sarwade, Nisha P. "Sensor Node Failure Detection Based on Round Trip Delay and Paths in WSNs" IEEE Sensors Journal, vol. 14, No. 2, Feb. 2014, pp. 455-464.

Girish K and Shruthi G. "Design and Implementation of detecting the failure of senor node based on RTT time and RTPs in WSNs" IJISET—International Journal of Innovative Science, Engineering & Technology, vol. 2 Issue 4, Apr. 2015, pp. 1295-1299.

Iannaccone et al. "Analysis of link failures in an IP backbone." IMW '02 Proceedings of the 2nd ACM SIGCOMM Workshop on Internet Measurement, Nov. 6-8, 2002, 6 pages.

(56) References Cited

OTHER PUBLICATIONS

Wisitpongphan et al. "On the Routing Problem in Disconnected Vehicular Ad Hoc Networks" INFOCOM 2007. 26th IEEE International Conference on Computer Communications, May 6-12 2007, Carnegie Mellon University, DOI 10.1109/INFCOM.2007.267, pp. 2291-2295.

Prentzas et al. Categorizing Approaches Combining Rule-Based and Case-Based Reasoning. Expert Systems 24, Apr. 17, 2007, pp. 1-34 [online], [originally retrieved on Oct. 8, 2015]. Retrieved from the Internet <URL:http://citeseerx.ist.psu.edu/viewdoc/download?doi=10.1.1.143.2780&rep=rep1&type=pdf>.

\* cited by examiner

COMPUTER SYSTEM AND METHOD FOR HANDLING NON-COMMUNICATIVE ASSETS

BACKGROUND

Today, machines (also referred to herein as "assets") are ubiquitous in many industries. From locomotives that transfer cargo across countries to farming equipment that harvest crops, assets play an important role in everyday life.

Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

For instance, an organization that is interested in monitoring and analyzing assets in operation may deploy an asset data platform that is configured to receive and analyze various types of asset-related data. For example, the asset data platform may be configured to receive and analyze data indicating asset attributes, such as asset identifiers, asset operating data, asset configuration data, asset location data, etc. As another example, the data-analysis platform may be configured to receive and analyze asset maintenance data, such as data regarding inspections, servicing, and/or repairs. As yet another example, the data-analysis platform may be configured to receive and analyze external data that relates to asset operation, such as weather data, traffic data, or the like. The data-analysis platform may be configured to receive and analyze various other types of asset-related data as well.

Further, the asset data platform may receive this asset-related data from various different sources. As one example, the data-analysis platform may receive asset-related data from the assets themselves. As another example, the asset data platform may receive asset-related data from some other platform or system (e.g., an organization's existing platform) that previously received and/or generated asset-related data. As yet another example, the asset data platform may receive asset-related data from an external data source, such as an asset maintenance data repository, a traffic data provider, and/or a weather data provider for instance. The asset data platform may receive asset-related data from various other sources as well.

OVERVIEW

In many instances, an asset data platform may be monitoring and analyzing the operation of a group of assets (e.g., a "fleet" of assets). In general, the amount of computing resources required of the asset data platform to monitor and analyze the operation of the fleet of assets increases as the size of that fleet increases. For instance, as the number of assets increases, so too does the amount of data that the asset data platform receives, processes, and analyzes in order to monitor the operation of each of those assets.

Typically, existing asset data platforms handle data from assets regardless of the state of the data and/or the context in which the data is received, which may cause a variety of problems. For example, existing data platforms may unnecessarily expend computing resources on, and/or divert computing resources from other matters to, analyses that may not be productive because of the state and/or context of the received data. As another example, existing data platforms may perform analyses and/or train predictive models based on an incomplete dataset, which may cause inaccurate predictions and the like that may in turn inhibit the ability to stop asset failures before they happen.

To help address one or more of these shortcomings, disclosed herein are improved systems, devices, and methods for handling operating data from non-communicative assets. According to example embodiments, the improvements disclosed herein may be embodied and/or carried out by an asset data platform that is configured to determine whether a given asset is non-communicative (i.e., not properly transmitting data with a normal frequency and/or timeliness to the asset data platform), and while the given asset is non-communicative, handle asset-related data from the given asset in accordance with the given asset being deemed non-communicative, such as by suspending data analytics for the given asset.

In operation, assets are usually located out in the field and communicate, via a communication network (e.g., a cellular network), with an asset data platform that is remote from the assets. Broadly speaking, the assets may be part of the "Internet-of-Things" (IoT) or otherwise leverage IoT technology. A standard communication between an asset and an asset data platform may take the form of the asset transmitting operating data to the asset data platform. Typically, assets communicate operating data to the asset data platform in the form of discrete transmissions. Each transmission may include one or more operating data points, where a given operating data point may take the form of a sensor or actuator measurement or a fault code, among other examples.

In practice, an asset's ability to transmit operating data to the asset data platform may depend on the coverage area of the communication network, as well as on environmental conditions. Moreover, the assets are typically mobile, and so, an asset's ability to communicate with the asset data platform may change as the asset moves. For instance, if an asset moves underground, enters a tunnel, or enters an area with objects that interfere with over-the-air communication signals, the asset might lose communication with the asset data platform, perhaps for an extended period of time. Thus, from the perspective of the asset data platform, assets might become non-communicative temporarily or for a prolonged period of time, during which the asset may be generating operating data points and attempting to transmit that data to the asset data platform but that data does not ultimately reach the asset data platform.

Certain malfunctions at an asset may also impact the asset's ability to communicate with the asset data platform. For instance, if an asset's wireless network interface (or other associated components) begins to malfunction, the asset's communication with the asset data platform may become irregular or may stop altogether.

In practice, the asset data platform may be configured to determine whether a given asset has been in a non-communicative state in a variety of manners. For instance, in example embodiments, this operation may involve the asset data platform detecting a communication abnormality based on received transmissions of operating data from the given asset. The asset data platform may be configured to utilize one or multiple techniques to detect a communication abnormality, such as one or more of the following possible example techniques.

In one example technique, the asset data platform may analyze transmissions of operating data received from the given asset to determine whether there has been an unexplained "gap" in the transmission of operating data for the given asset, which would indicate that the given asset was non-communicative. More specifically, the asset data platform may first analyze the transmissions of operating data received from the given asset to determine whether there have been any periods of time that exceed a first threshold length of time (e.g., 500 hours) during which the asset data platform lacks operating data from the given asset. Depending on the implementation, this function may be performed in a variety of manners.

As one example, the asset data platform may analyze the operating data points that it received from the given asset and the times at which the given asset generated each of those operating data points (or perhaps the times at which the given asset transmitted the data points to the asset data platform), and then determine whether there has been a period of time that exceeds the first threshold length of time during which there is a lack of operating data generated (or transmitted) by the given asset. As another example, the asset data platform may determine whether there has been a period of time that exceeds the first threshold length of time during which the asset data platform failed to receive any transmissions of operating data from the given asset. Other example manners of identifying data gaps are also possible.

If a data gap is identified, the asset data platform may then evaluate whether the identified data gap can be explained, which may be performed in a variety of manners. As one example, the asset data platform may evaluate whether there was any event coinciding with the identified data gap that explains the data gap, such as the given asset being repaired starting within a certain amount of time before the start of the data gap and ending about the same time of the end of the data gap. If the asset data platform is unable to ascertain an explanation of the data gap, the asset data platform may then designate the given asset as non-communicative.

In another example technique, the asset data platform may analyze transmissions of operating data received from the given asset, as well as from other assets, to determine whether the given asset was communicating "sparsely," which would indicate that the given asset was non-communicative. In particular, the asset data platform may perform an evaluation of how much operating data it received from the given asset over a given amount of time (e.g., 7 days) relative to how much operating data it received from the other assets in the given asset's fleet during the same given amount of time, and if this evaluation indicates that the amount of operating data received from the given asset is abnormally low as compared to the amount of operating data received from the other assets in the given asset's fleet, the given asset is deemed to have been in a "sparse" non-communicative state. The asset data platform may perform this evaluation in various manners.

As one possible implementation, the asset data platform may first perform an evaluation of the respective amount of operating data received from each asset in the fleet (including the given asset) over a certain amount of time (e.g., 7-day windows of time) to define a threshold amount of operating data, which may serve as the dividing line between the assets in the fleet that are transmitting a "normal" amount of operating data and assets that are transmitting an abnormally low amount of operating data. In this respect, the threshold amount of operating data may be a value that corresponds to a given percentile of a distribution of operating data amounts received from the fleet of assets, among other examples. In turn, the asset data platform may compare the amount of operating data received from the given asset to the defined threshold and thereby determine whether given asset is non-communicative.

Prior to performing an evaluation of the respective amount of operating data received from each asset in the given asset's fleet, the asset data platform may divide the operating data received from each asset into windows of time (e.g., 7 day windows of time) and determine the respective amount of operating data received from each asset in the fleet in each of these windows (e.g., by "rolling up" the operating data received from each asset in the fleet on a 7-day basis, a 28-day basis, etc.). In this respect, the function of defining the threshold amount of operating data and comparing the given asset's amount of operating data to the threshold amount of operating data may be performed based on the respective amounts of operating data for the windows of time, rather than the total amount of operating data received during the entire time assets are in service.

For example, after determining the respective amount of operating data received from each asset in the fleet in each of a plurality of windows (e.g., on a 7-day or 28-day basis), the asset data platform may determine a representative amount of operating data received from each asset in the fleet per window (e.g., a mean, median, or mode of the weekly or monthly amount of operating data received from the asset), which may be used to define a threshold that is reflective of a minimum amount of operating data points received from an asset in a normal, communicative state. In turn, this threshold may be compared either to the representative amount of operating data received from the given asset per window or to the respective amount of operating data received from the given asset in each window in order to determine whether given asset is non-communicative. Other implementations are possible as well.

In yet another example technique, the asset data platform may analyze transmissions of operating data received from the given asset to determine whether the given asset was communicating in a "delayed" manner, which would indicate that the given asset was non-communicative. In particular, for each received transmission of operating data, the asset data platform may determine the difference between (1) a time that one or more of the operating data points in the transmission were generated at the given asset and (2) a time that the transmission was first acknowledged by the asset data platform (e.g., the time that the asset data platform received, ingested, or stored the data). If this difference exceeds a threshold delay that is indicative of an acceptable amount of delay for transmission of operating data (e.g., 12 hours), the asset data platform may then designate the given transmission of operating data as "delayed." In the event that the number of "delayed" transmissions of operating data received from the given asset (e.g., over a given window of time) exceeds a threshold number of delayed transmissions, the asset data platform may then designate the given asset as non-communicative.

While the given asset is designated a non-communicative asset, the asset data platform may be configured to handle operating data from the given asset in accordance with the non-communicative designation. As examples, the asset data platform may suspend the performance of data analytics for the given asset, disregard operating data received from the given asset, and/or isolate operating data received from the given asset to a particular storage location within the platform. In this way, the asset data platform may preserve computing resources by ceasing to handle operating data from the given asset as it typically would. This may also help ensure that the asset data platform is not performing analyses on behalf of the given asset based on an incomplete dataset, which might otherwise lead to inaccurate predictions and operational failures at the given asset. Other benefits of the improvements disclosed herein are also possible.

As discussed above, the examples provided herein are related to improvements to handling operating data from non-communicative assets. In one aspect, a computer-implemented method is provided. The method comprises: (1) receiving, via a network interface, a plurality of operating data points from a given asset of a plurality of assets, (2) based on at least one of the received operating data points, detecting a communication abnormality at the given asset, wherein detecting the communication abnormality at the given asset comprises at least one of: (a) determining that there has been a gap in operating data points received from the given asset that exceeds a threshold gap time and cannot be explained, (b) determining that an amount of operating data points received from the given asset over a given amount of time is abnormally low as compared to the amount of operating data points received from the other assets in the plurality of assets over the given amount of time, or (c) determining that a number of delayed operating data points received from the given asset exceeds a threshold number of delayed operating data points, (3) in response to detecting the communication abnormality, designating the given asset as being non-communicative, and (4) handling operating data points received from the given asset in accordance with the non-communicative designation.

In another aspect, a computing system is provided. The computing system comprises a network interface configured to facilitate communications over a communication network with a plurality of assets, at least one processor, a non-transitory computer-readable medium, and program instructions stored on the non-transitory computer-readable medium that are executable by the at least one processor. The program instructions are executable by the at least one processor to cause the computing system to: (1) receive, via the network interface, a plurality of operating data points from a given asset of the plurality of assets, (2) based on at least one of the received operating data points, detect a communication abnormality at the given asset, wherein detecting the communication abnormality at the given asset comprises at least one of: (a) determining that there has been a gap in operating data points received from the given asset that exceeds a threshold gap time and cannot be explained, (b) determining that an amount of operating data points received from the given asset over a given amount of time is abnormally low as compared to the amount of operating data points received from the other assets in the plurality of assets over the given amount of time, or (c) determining that a number of delayed operating data points received from the given asset exceeds a threshold number of delayed operating data points, (3) in response to detecting the communication abnormality, designate the given asset as being non-communicative, and (4) handle operating data points received from the given asset in accordance with the non-communicative designation.

In yet another aspect, a non-transitory computer-readable medium is provided having program instructions stored thereon that are executable to cause a computing system to: (1) receive a plurality of operating data points from a given asset of a plurality of assets, (2) based on at least one of the received operating data points, detect a communication abnormality at the given asset, wherein detecting the communication abnormality at the given asset comprises at least one of: (a) determining that there has been a gap in operating data points received from the given asset that exceeds a threshold gap time and cannot be explained, (b) determining that an amount of operating data points received from the given asset over a given amount of time is abnormally low as compared to the amount of operating data points received from the other assets in the plurality of assets over the given amount of time, or (c) determining that a number of delayed operating data points received from the given asset exceeds a threshold number of delayed operating data points, (3) in response to detecting the communication abnormality, designate the given asset as being non-communicative, and (4) handle operating data points received from the given asset in accordance with the non-communicative designation.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
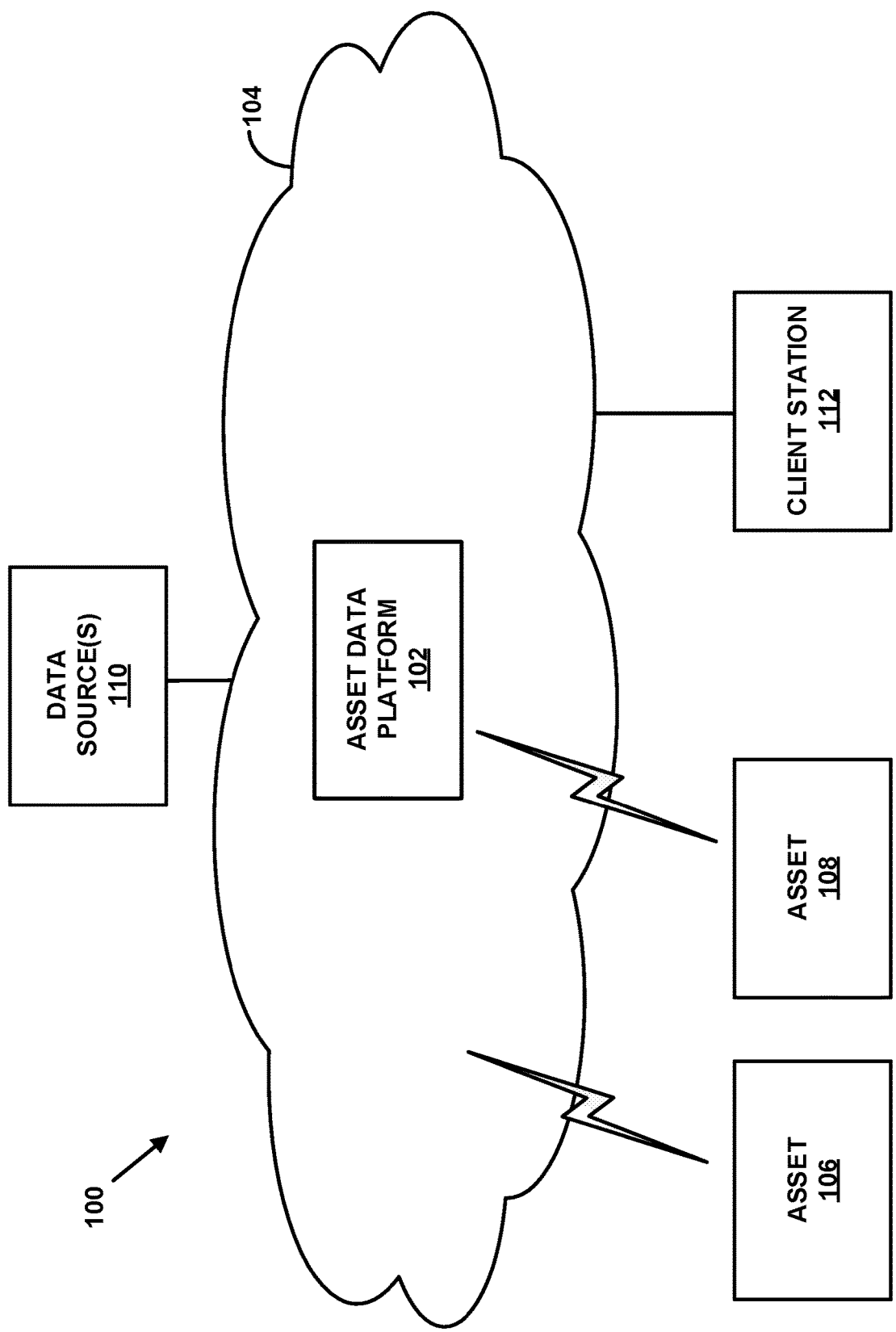
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset attribute data. For instance, a platform may include one or more servers (or the like) having hardware components and software components that are configured to carry out one or more of the functions disclosed herein for receiving, ingesting, processing, analyzing, and/or providing access to asset attribute data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset attribute data, via the communication network 104, that is sent by one or more assets and/or data sources. As another example, the asset data platform 102 may transmit asset attribute data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset attribute data to one or more intermediary systems, such as an asset gateway or an organization's existing platform (not shown), and the asset data platform 102 may then be configured to receive the asset attribute data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), abnormal-condition indicator data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, manufacturing equipment, processing equipment, assembly equipment, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of excavators, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include image-data servers (e.g., servers maintaining satellite, camera-based, and/or remotely-sensed image data), map-data servers, weather-data servers, global navigation satellite systems (GNSS) servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

The asset data platform 102 may receive data from the data source 110 in various manners. According to one example, the asset data platform 102 may be configured to periodically request and receive data from the data source 110. In another example, the asset data platform 102 may receive data from the data source 110 by "subscribing" to a service provided by the data source. The asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. EXAMPLE ASSET

Figure 2:
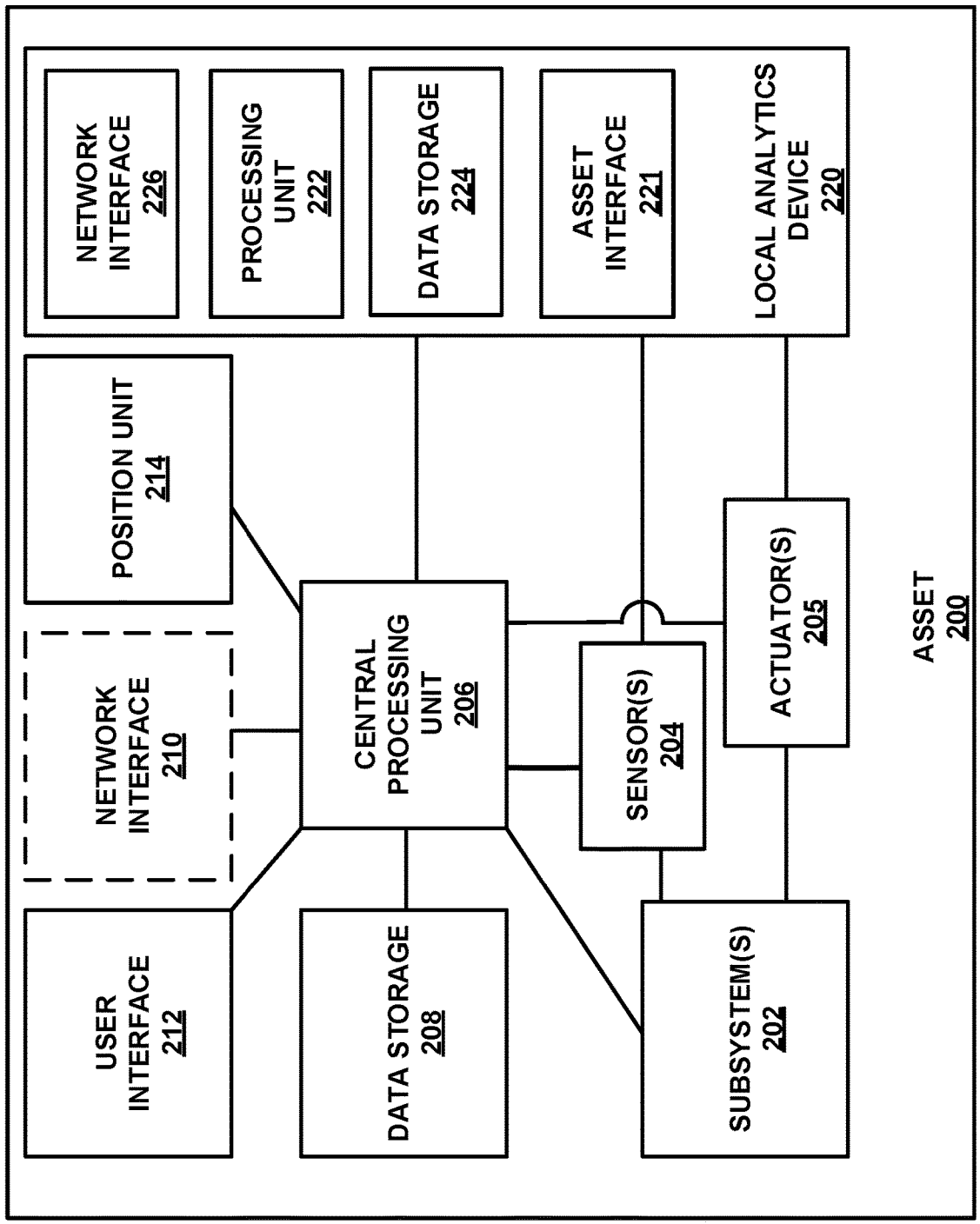
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which is a form of abnormal-condition indicator data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
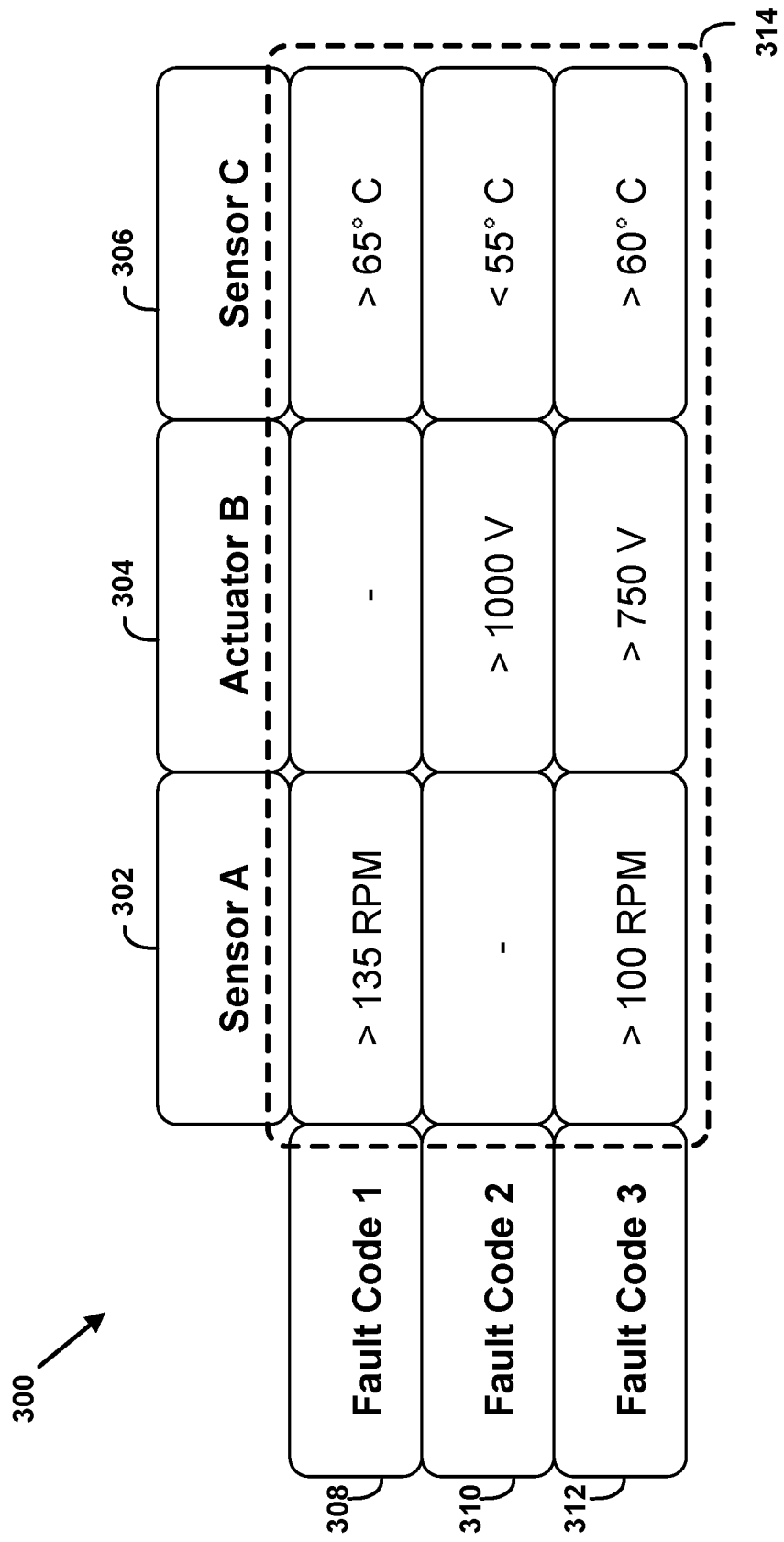
FIG. 3 depicts a conceptual illustration of example abnormal-condition indicators and triggering criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify signal criteria (e.g., sensor and actuator value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above. Additionally or alternatively, the network interface 210 may be configured to facilitate application layer communications according to an encrypted protocol such as HTTPS carrying messages in a format such as XML or JSON. In some embodiments, the asset 200 may not include the network interface 210, as indicated by the dashed lines.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset attribute data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces 221 that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally, or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces 221 discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces 221, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. EXAMPLE PLATFORM

Figure 4:
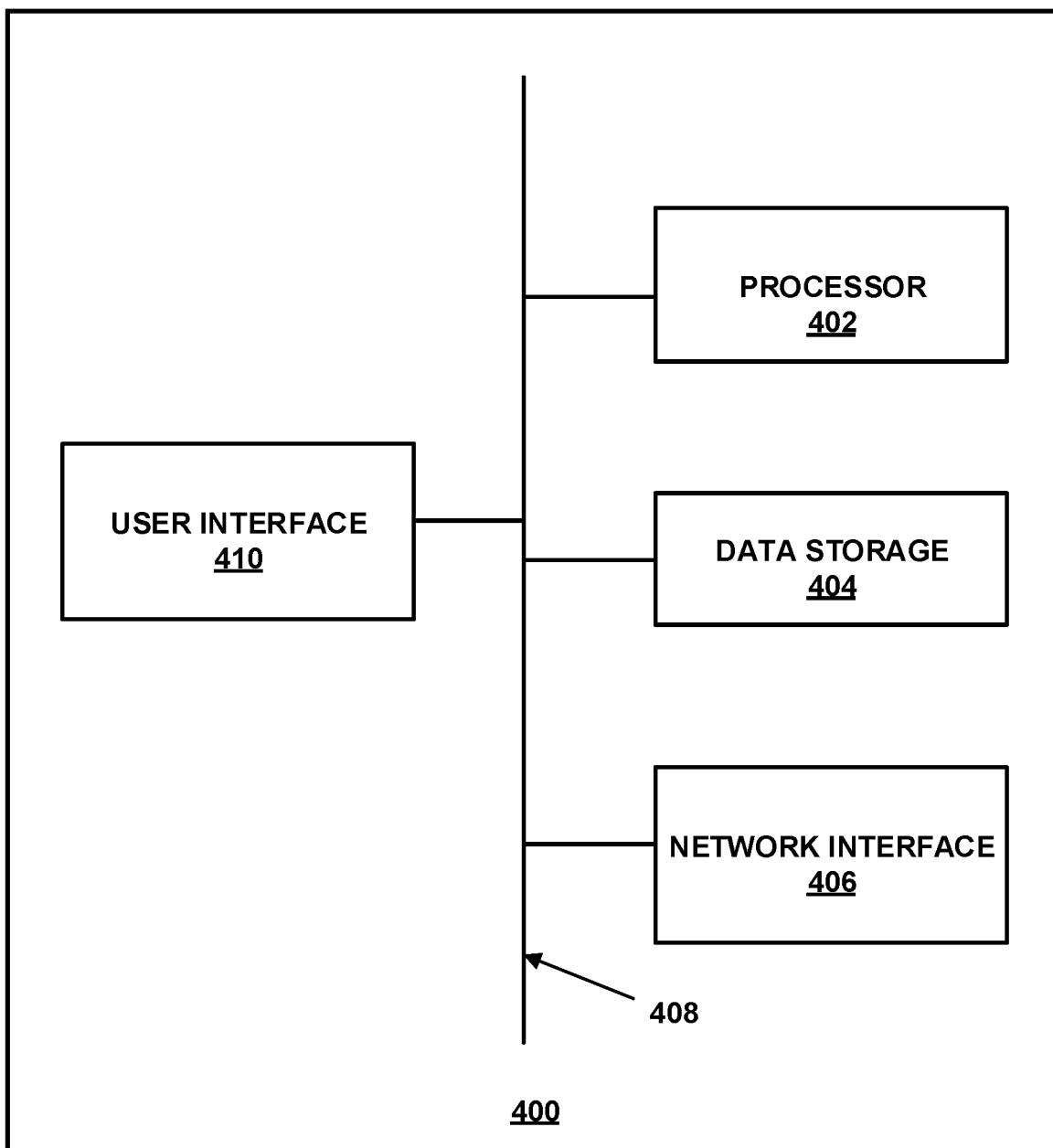
FIG. 4 depicts a structural diagram of an example platform.

FIG. 4 is a simplified block diagram illustrating some components that may be included in an example asset data platform 400 from a structural perspective. In line with the discussion above, the asset data platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

The data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as WL, and Base64. Other configurations are possible as well.

The example asset data platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
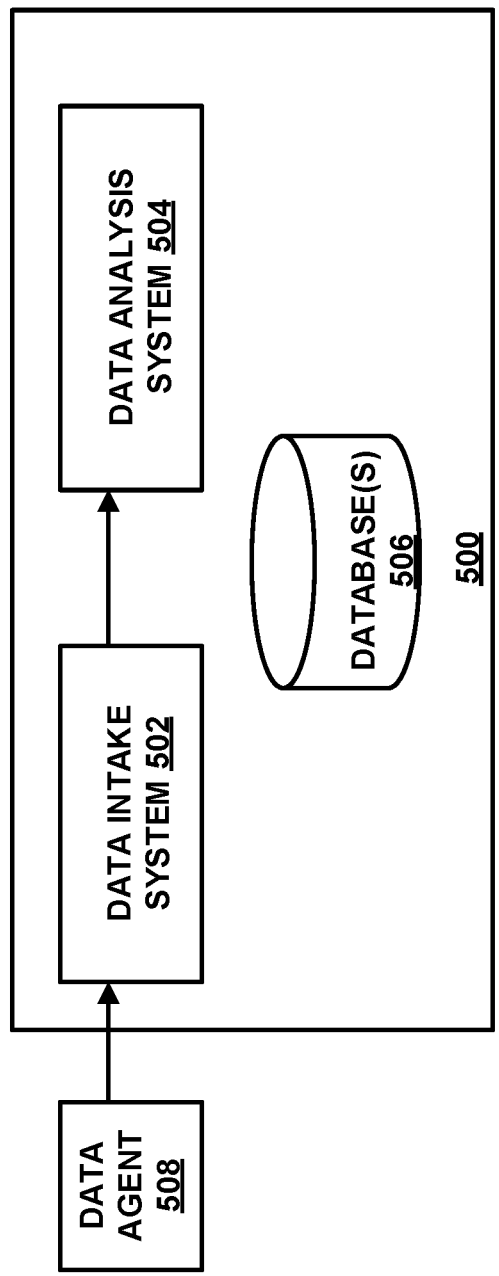
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset attribute data and then provide at least a portion of the received data to the data analysis system 504. As such, the data intake system 502 may be configured to receive asset attribute data from various sources, examples of which may include an asset, an asset attribute data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset attribute data source, etc.), that source may be provisioned with a data agent 508. In general, the data agent 508 may be a software component that functions to access asset attribute data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset attribute data to the example platform 500 without the assistance of a data agent.

The asset attribute data received by the data intake system 502 may take various forms. As one example, the asset attribute data may include data related to the attributes of an asset in operation, which may originate from the asset itself or from an external source. This asset attribute data may include asset operating data such as signal data (e.g., sensor and/or actuator data), abnormal-condition indicator data, asset location data, weather data, hotbox data, etc. In addition, the asset attribute data may also include asset configuration data, such as data indicating the asset's brand, make, model, age, software version, etc. As another example, the asset attribute data may include certain attributes regarding the origin of the asset attribute data, such as a source identifier, a timestamp (e.g., a date and/or time at which the information was obtained or generated), and an identifier of the location at which the information was obtained or generated (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset attribute data received by the data intake system 502 may take other forms as well.

The data intake system 502 may also be configured to perform various pre-processing functions on the asset attribute data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset attribute data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset attribute data in a first type of database (e.g., a time-series or document database) and may store the associated metadata of received asset attribute data in a second type of database that permit more rapid searching (e.g., a relational database). In such an example, the metadata may then be linked or associated to the asset attribute data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw or aggregated data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. EXAMPLE OPERATIONS

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein are improved systems, devices, and methods for handling operating data for non-communicative assets. According to example embodiments, the improvements disclosed herein may be embodied and/or carried out by an asset data platform (e.g., the asset data platform 102 of FIG. 1) that is configured to determine whether a given asset (e.g., the asset 106 of FIG. 1) is non-communicative (i.e., not properly transmitting asset-related data with a normal frequency and/or timeliness to the asset data platform), and while the given asset is non-communicative, handle asset-related data from the given asset in accordance with the given asset being deemed non-communicative.

Figure 6:
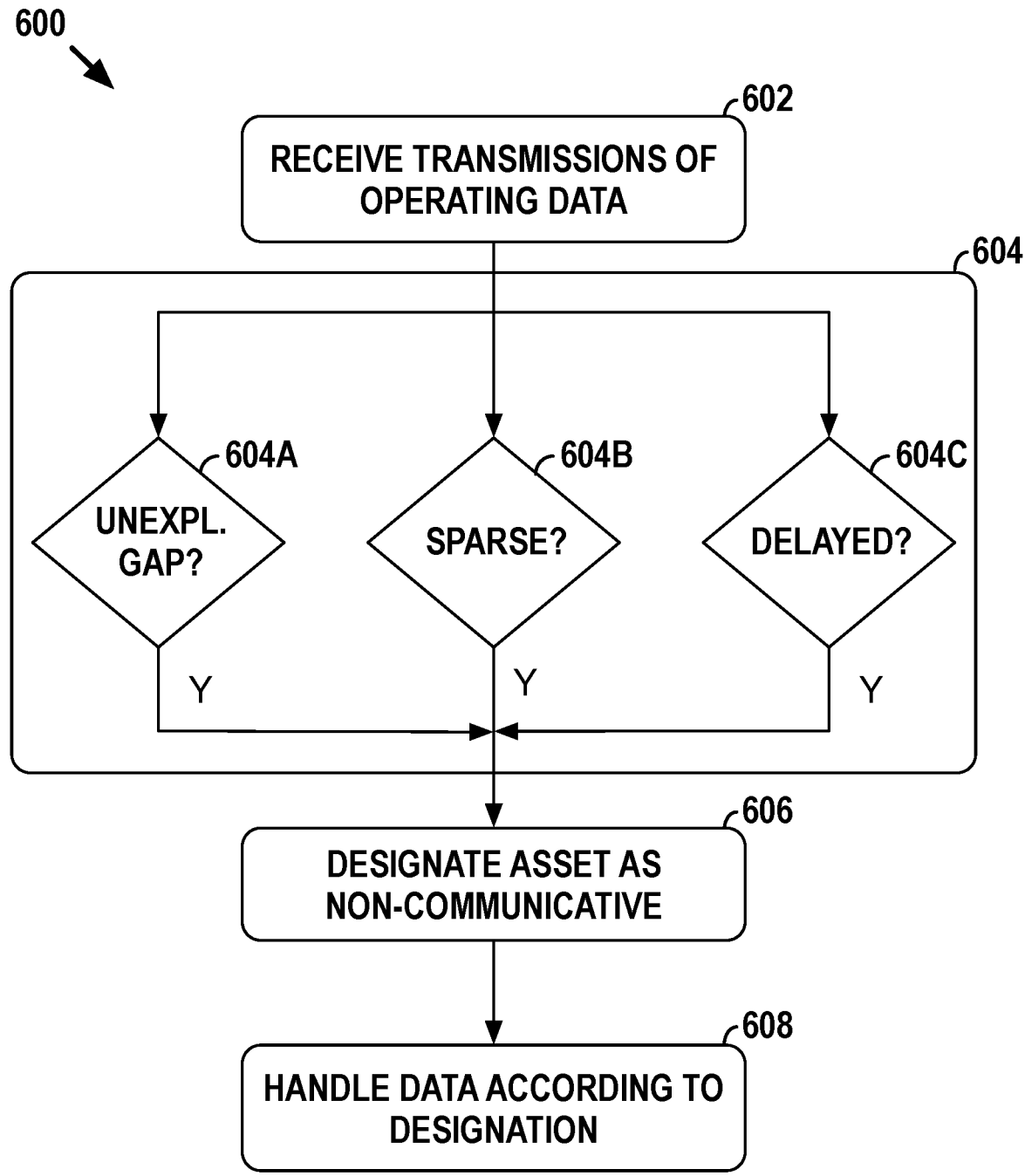
FIG. 6 is a flow diagram of example functions associated with handling operating data for non-communicative assets.

FIG. 6 is a flow diagram 600 of example functions associated with handling operating data for non-communicative assets. For the purposes of explanation, these example functions are described as being carried out by the asset data platform 102, but some or all of the example functions could be performed by systems other than the platform or which work in conjunction with the platform. Further, it should be understood that flow diagram 600 is provided for sake of clarity and explanation and that numerous other combinations of functions may be utilized to facilitate handling operating data for non-communicative assets—including the possibility that example functions may be added, removed, rearranged into different orders, combined into fewer blocks, and/or separated into additional blocks depending upon the particular embodiment.

Briefly, at block 602, the asset data platform 102 may receive multiple transmissions of operating data from at least one given asset. At block 604, the asset data platform 102 may determine whether the given asset has been in a non-communicative state, which may be determined based on one or more processes. At block 606, the asset data platform 102 may designate the given asset as being non-communicative based on the determination made at block 604. At block 608, the asset data platform 102 may handle operating data from the given asset in accordance with the non-communicative designation.

Turning now to a more detailed discussion of these example functions, at block 602, the asset data platform 102 may receive multiple, discrete transmissions of operating data from at least one given asset. In general, a given transmission of operating data may include one or more operating data points, where a given operating data point may take the form of signal data (i.e., sensor and/or actuator data) or abnormal-condition indicator data, among other examples. In turn, each given operating data point may include a timestamp or some other time indicator that identifies when the operating data point was generated by, or otherwise originated at, the given asset (i.e., the time indicator identifies a "generation time"). In some embodiments, each given operating data point may additionally or alternatively include another timestamp (or some other time indicator) that identifies when the given asset sent the operating data point to the asset data platform 102 (i.e., the time indicator identifies a "sent time").

In practice, in circumstances where a given transmission includes multiple operating data points, the operating data points may all have the same generation time or some or all of the operating data points may have different generation times. For example, an asset may be configured to periodically generate, for instance, four operating data points corresponding to a speed, temperature, voltage, and RPM reading at the asset, all at the same time, and then include those four operating data points in a single transmission. In other examples, the asset may be configured such that it generates the four operating data points corresponding to the speed, temperature, voltage, and RPM reading at the asset, at different times, but nonetheless, includes those four operating data points in a single transmission. Other examples are also possible.

In example embodiments, for each operating data point, the asset data platform 102 may generate a timestamp or some other time indicator that identifies when the asset data platform 102 first acknowledged the given operating data point (i.e., the time indicator identifies an "acknowledgment time"). For instance, the acknowledgment time may indicate when the asset data platform 102 received the operating data point (e.g., when the asset data platform 102's data intake system received the data), ingested the operating data point (e.g., when the asset data platform 102's data intake system accepted the data into the platform), or stored the operating data point in data storage. Other examples are also possible.

The asset data platform 102 may then associate each given operating data point along with its corresponding acknowledgment time indicator. In practice, the asset data platform 102 may receive transmissions of operating data and then maintain the operating data points in data storage for future analysis, or perhaps perform real-time analysis on the operating data points as transmissions are received.

Typically, the asset data platform 102 receives respective transmissions of operating data from numerous assets, such as from each asset in a fleet of assets that the asset data platform 102 is monitoring. One of ordinary skill in the art will appreciate that the discussion herein of the asset data platform 102 performing functions for a single asset is readily extendable to the asset data platform 102 performing the same or similar functions for multiple assets.

Next, at block 604 of FIG. 6, the asset data platform 102 may determine whether the given asset has been in a non-communicative state based on the received operating data points from block 602. Depending on the circumstances, determining whether the given asset has been in a non-communicative state may indicate that at some period of time in the past (i.e., before the asset data platform 102 makes its determination at block 604), the given asset was non-communicative, or that the given asset became non-communicative in the past and currently continues to be non-communicative.

In practice, the asset data platform 102 may be configured to determine whether the given asset has been in a non-communicative state in a variety of manners. For instance, this function may involve the asset data platform 102 detecting a communication abnormality based on the received transmissions of operating data from the given asset. In general, a communication abnormality may be a temporary or prolonged deviation from a communicative state, where the communicative state is defined based on criteria, such as a frequency and/or timeliness of data transmissions.

In example embodiments, the asset data platform 102 may be configured to utilize one or multiple techniques to detect a communication abnormality, such as one or more of the example techniques represented by blocks 604A, 604B, and 604C. One of ordinary skill in the art will appreciate that, although FIG. 6 depicts each of the blocks 604A, 604B, and 604C, the asset data platform 102 may be configured to detect a communication abnormality utilizing the functions of a single one of these blocks or some combination of the functions of the three blocks.

Turning now to the specifics of block 604A, the asset data platform 102 may determine whether there has been any "gap" in the transmission of operating data from the given asset that cannot be explained, which the asset data platform 102 may use as one basis for inferring that the given asset was non-communicative. In particular, the asset data platform 102 may first monitor the operating data points received from the given asset to determine whether there have been any periods of time that exceed a threshold length of time (e.g., a "data-gap threshold") during which the asset data platform 102 lacks operating data points from the given asset, which it may determine in a variety of manners.

For example, the asset data platform 102 may analyze the operating data points that it received from the given asset, perhaps over a given window of time, and the corresponding generation times for those operating data points. The asset data platform 102 may then sort these generation times in chronological order and determine whether there are any gaps of time in the ordered generation times that exceed a data-gap threshold (e.g., 500 hours). In this way, the asset data platform 102 may identify instances in the operating data points that it actually received from the given asset that suggest that the asset did not generate operating data points for a period of time, even though the given asset may have actually generated operating data points during that time but the data did not reach the asset data platform 102.

As another example, in some embodiments in which operating data points include a sent time, the asset data platform 102 may instead analyze the sent times of the operating data points that it received from the given asset and chronologically sort those sent times. Similar to the above example, if there are any gaps of time in the sorted sent times that exceed a data-gap threshold (e.g., 300 hours), then the asset data platform 102 may determine that there was a data gap.

In yet another example, the asset data platform 102 may instead identify a data gap by determining whether there have been any periods of time that exceed a data-gap threshold (e.g., three weeks) during which the asset data platform 102 did not receive a transmission of operating data from the given asset. In particular, the asset data platform 102 may analyze the acknowledgment times of the operating data points that it received from the given asset and chronologically sort those acknowledgment times. If there are any gaps of time in the sorted acknowledgment times that exceed a data-gap threshold, then the asset data platform 102 may determine that there was a data gap.

In some examples, the asset data platform 102 may be configured to identify data gaps as it receives (or fails to receive) data from assets, which it may do in a variety of manners. For example, one or more of the functions described with reference to block 604A may be adapted for real-time or near real-time data gap identification. As another example, for each asset, the asset data platform 102 may maintain a timer or the like that keeps track of how long it has been since it last received a transmission of operating data from the given asset. In the event that the asset data platform 102 has not received a transmission from the given asset for an amount of time that exceeds a data-gap threshold, the asset data platform may determine that there is a data gap. Other examples of the asset data platform 102 identifying data gaps are also possible.

Figure 7A:
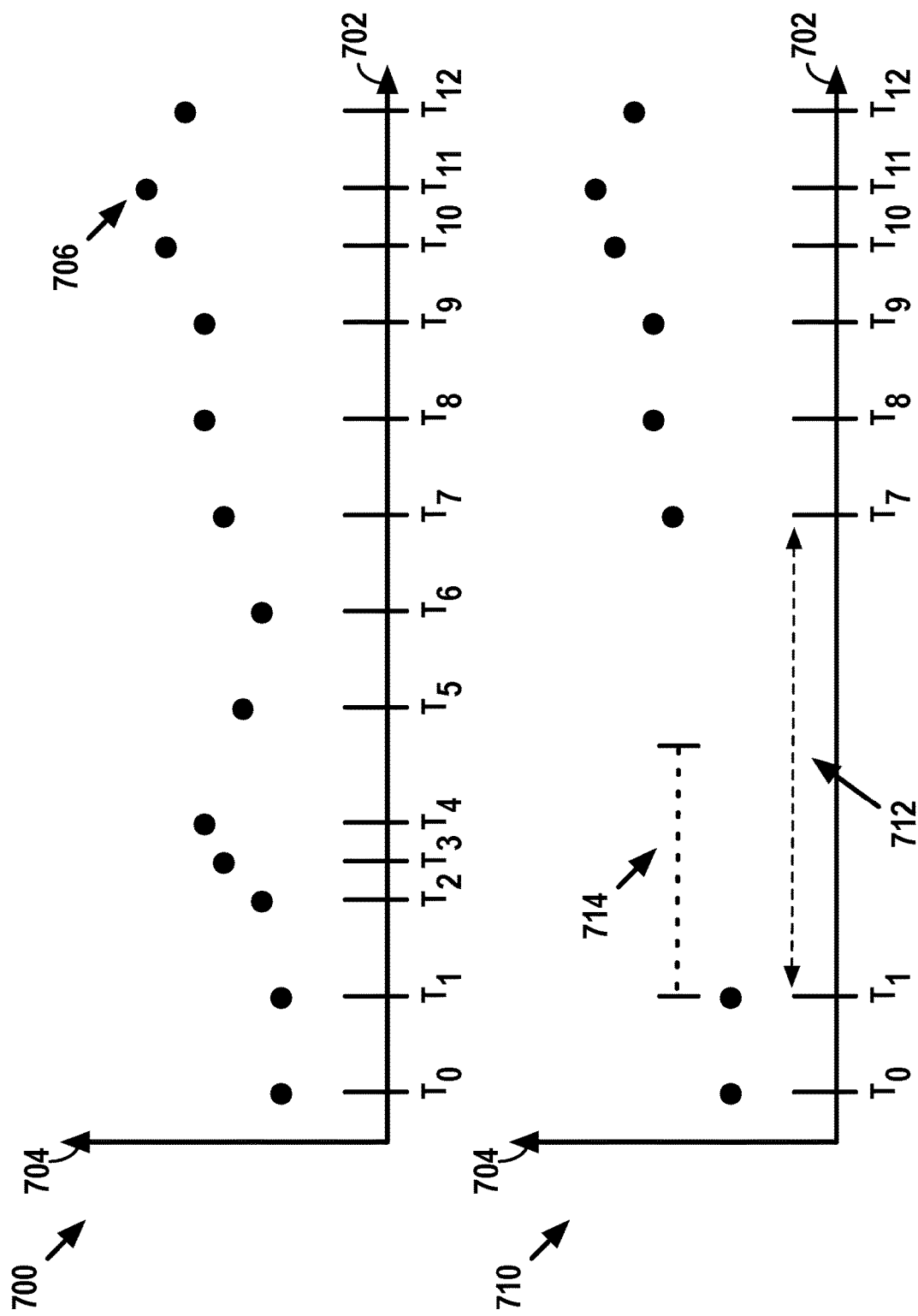
FIG. 7A depicts a conceptual illustration of an example data gap.

FIG. 7A provides a conceptual illustration of an example data gap. In particular, FIG. 7A shows data plot 700 representing operating data points that are generated by the given asset over time and data plot 710 representing operating data points that the asset data platform 102 actually received from the given asset. Each of the data plots 700, 710 includes a time axis 702, an operating data 704 axis, and multiple operating data points 706, and in this example, the time axis 702 represents the time when the given asset generated the corresponding operating data points (i.e., "$T_0$"-"$T_{12}$" are generation times).

As shown in data plot 700, the given asset generated operating data points at each of times $T_1$-$T_{12}$. However, as shown in data plot 710, the operating data points that the asset data platform actually received from the given asset did not include the operating data points generated by the given asset at times $T_2$-$T_6$, which is why the operating data points depicted in data plot 710 skip from the operating data point having generation time $T_1$ to the operating data point having a generation time $T_7$. This results in a period of time 712 between the operating data point at $T_1$ and the operating data point at $T_7$ that exceeds a data-gap threshold 714 during which the asset data platform 102 lacks generated operating data for the given asset. Thus, despite the given asset generating operating data points at times $T_2$-$T_6$ (as shown in data plot 700), the asset data platform 102 did not receive those operating data points. This may have been the result of a prolonged communication failure between the given asset and the asset data platform 102. In any event, the asset data platform 102 may flag the period of time 712 as an instance of a gap.

For each identified data gap, the asset data platform 102 may evaluate whether the given gap can be explained, which may be performed in a variety of manners. For instance, in example embodiments, the asset data platform 102 may determine, based on asset-related data associated with asset events, whether any event occurred coinciding with the identified data gap that could explain the gap. More specifically, the asset data platform 102 may evaluate asset-related data from around the time of the identified gap and determine whether any events occurred during the identified gap that are relevant to the given asset. Examples of asset-related data that may be useful in determining whether an identified data gap can be explained may include data indicative of a scheduled and/or completed maintenance event for the given asset (e.g., data indicating that the given asset was scheduled to receive an oil change on a particular date and that the oil change would take a certain amount of time to complete) or data indicative of a scheduled and/or completed repair event for the given asset (e.g., data indicating that the given asset broke down and then went under repair at a machine shop during particular dates). Other examples of asset-related data for use in determining an explanation of a data gap are possible, such as any of the examples discussed above.

As one illustrative example, asset-related data from around the time of the identified data gap may indicate that the given asset was scheduled for maintenance during the identified gap, in which case the asset data platform 102 may designate the particular identified gap as being "explained." In some implementations, the criteria for what qualifies as an "explaining" event may be more particular than the asset-related event merely occurring during the identified gap. In one particular example, an event is considered an explaining event if the event begins within a threshold amount of time from the start time of the identified gap (e.g., two weeks from the start of the gap) and the event ends about the end time of the identified gap (e.g., it ends before or at the end time of the gap). In such an example, if asset-related data indicates that the given asset started to be repaired one week from the start time of the identified data gap and the repairs were completed a day before the end time of the data gap, then the asset data platform 102 may designate the particular identified gap as being explained. Other examples of criteria for an "explaining" event are also possible.

If the asset data platform 102 is unable to ascertain an explanation of the identified data gap, the identified data gap is then designated an "unexplained" gap. In practice, the asset data platform 102 may attempt to ascertain an explanation for each identified data gap.

Back at FIG. 6, at block 604B, the asset data platform 102 may analyze transmissions of operating data received from the given asset, as well as transmissions of operating data received from other assets in the given asset's fleet, to determine whether the given asset was communicating "sparsely," which the asset data platform 102 may use as another basis for inferring that the given asset was non-communicative.

Figure 7B:
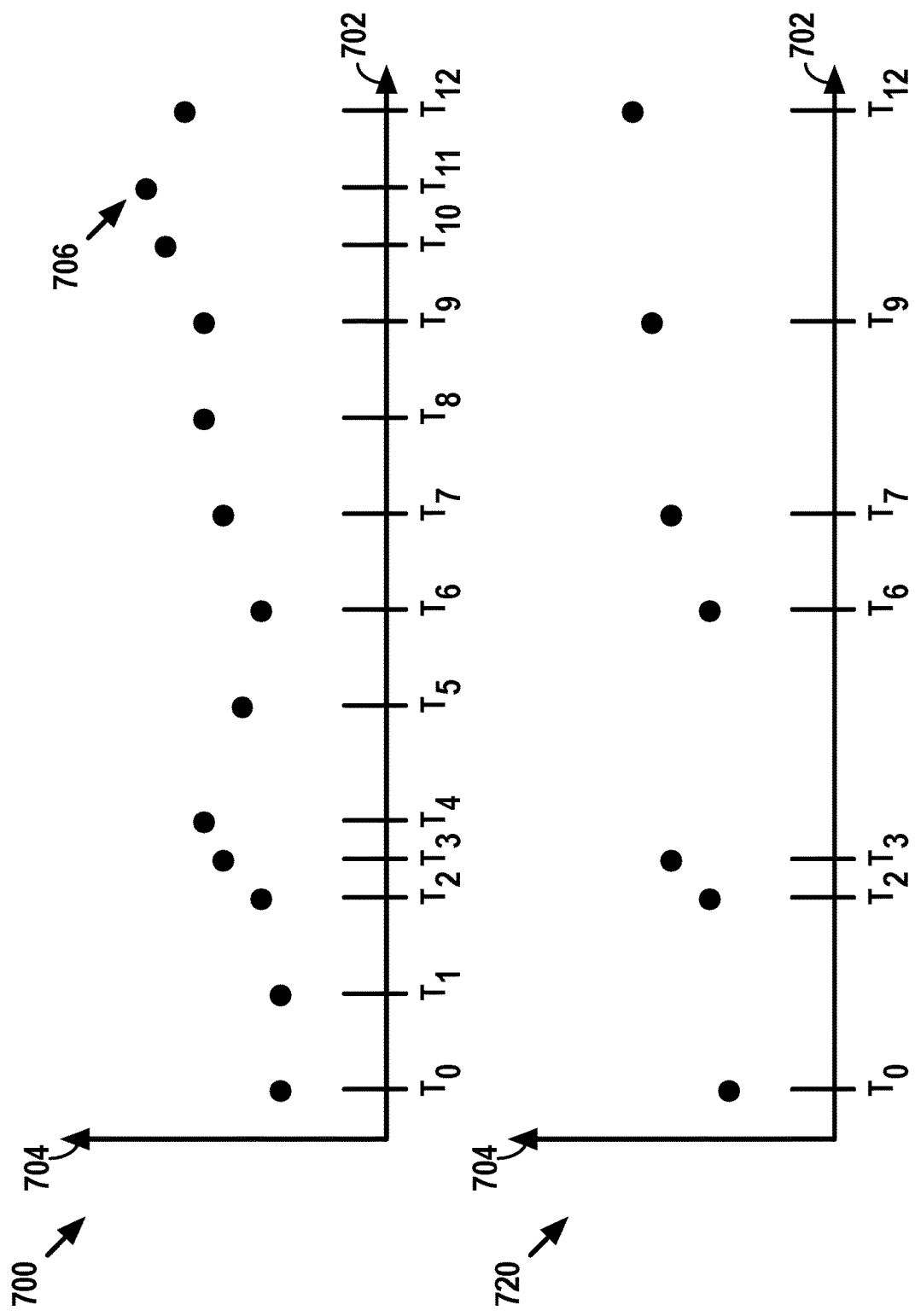
FIG. 7B depicts a conceptual illustration of an example of sparse data.

FIG. 7B provides a conceptual illustration of an example of sparse data. In particular, FIG. 7B shows data plot 700 representing operating data points that are generated by the given asset over time (from FIG. 7A) and data plot 720 representing operating data points that the asset data platform 102 actually received from the given asset. Data plot 720 is similar to data plots 700 and 710 in that the time axis 702 represents the time when the given asset generated the corresponding operating data points. As evident in comparing data plots 700 and 720, the operating data points that the asset data platform 102 actually received from the given asset are missing almost half of the operating data points that the given asset generated during the window of time between $T_0$-$T_{12}$. This may have been the result of intermittent communication failures between the given asset and the asset data platform 102. Thus, the operating data points received by the asset data platform (i.e., data plot 720) are "sparse" vis-à-vis the operating data points actually generated by the given asset (i.e., data plot 700).

In practice, the asset data platform 102, however, is only aware of the operating data points generated by the given asset that the asset data platform 102 actually receives. Accordingly, to determine whether the given asset qualifies as "sparsely" communicating, the asset data platform 102 may perform an evaluation of how much operating data it received from the given asset over a certain amount of time (e.g., 7-day windows of time) to how much operating data it received from the other assets in the given asset's fleet over an equivalent amount of time, and if this evaluation indicates that the amount of operating data received from the given asset is abnormally low as compared to the amount of operating data received from the other assets in the given asset's fleet, the given asset is deemed to have been in a "sparse" non-communicative state. The asset data platform 102 may perform this evaluation in various manners.

In example embodiments, broadly speaking, the asset data platform 102 may determine the amount of operating data points, received from the given asset, having generation times within windows of time in the past of a particular length (e.g., 7 days) and compare that to an amount of operating data points, received from the whole fleet of assets, having generation times within windows of time in the past of a length equivalent to the particular length. To perform this determination, the asset data platform may first perform an evaluation of the respective operating data point counts received from each asset in the fleet (including the given asset) during windows of time of equivalent length to define a fleet-wide distribution of operating-data-point counts, which may be utilized to identify assets in the fleet that are transmitting a "normal" amount of operating data and assets that are transmitting an abnormally low amount of operating data. For instance, a given percentile of the fleet-wide distribution may be defined as a count threshold that may be utilized to make determinations regarding "normal" and "abnormal" operating-data-point counts over time. In turn, the asset data platform 102 may compare the amount of operating data points received from the given asset to the defined threshold and thereby determine whether given asset is in a "sparse" non-communicative state.

Prior to performing an evaluation of the respective amount of operating data received from each asset in the given asset's fleet, the asset data platform 102 may divide the operating data received from each asset into windows of time and determine the respective amount of operating data received from each asset in the fleet in each of these windows. In this respect, the function of defining the threshold amount of operating data and comparing the given asset's amount of operating data to the threshold amount of operating data may be performed based on the respective amounts of operating data for the windows of time, rather than the total amount of operating data received during the entire time assets are in service.

More particularly, in example embodiments, the asset data platform 102 may begin by identifying operating data points that it received from the fleet of assets, including the given asset. In practice, the asset data platform 102 may analyze all the operating data points that it received over time from each asset in the fleet, or alternatively, it may analyze operating data points that correspond to a particular window of time (i.e., operating data points with generation times that fall within the particular window of time). In any event, for each asset, the asset data platform 102 may chronologically sort the identified operating data points based on, for example, the corresponding generation times.

For each asset in the fleet, the asset data platform 102 may evaluate the operating data points on a particular aggregate basis, such as a 7-day or monthly (e.g., 28-day) basis. In example embodiments, the asset data platform 102 may be configured to evaluate aggregated data points based on a "rolling" approach. For example, the asset data platform 102 may be configured to "roll up" data on a particular period of time basis (e.g., on a 7-day basis), where "rolling up" data may involve analyzing windows of time that overlap. Take for example assets that have been in service for 10 days and generated operating data on each of those 10 days (i.e., "days 1-10"). The asset data platform 102 may evaluate a count of how many operating data points each asset generated (and the asset data platform received) over those 10 days on a 7-day basis by analyzing multiple, contiguous 7-day periods and determining amounts of operating data for each of those periods. For example, the asset data platform would determine counts for days 1-7, days 2-8, days 3-9, and days 4-10.

Table 1 below provides an example of operating data point counts determined by the asset data platform 102 for four assets in a given fleet. In this particular example, the asset data platform has 10-days' worth of received operating data for each asset, and the data counts for each asset have been "rolled up" on a 7-day basis. Accordingly, as one example, the asset data platform 102 received from "Asset 1" 65 operating data points generated by Asset 1 over days 1-7, 77 operating data points generated by Asset 1 over days 2-8, 80 operating data points generated by Asset 1 over days 3-9, and 70 operating data points generated by Asset 1 over days 4-10.

TABLE 1

|  | Days 1-7 | Days 2-8 | Days 3-9 | Days 4-10 |
|---|---|---|---|---|
| Asset 1 | 65 | 77 | 80 | 70 |
| Asset 2 | 85 | 88 | 79 | 95 |
| Asset 3 | 82 | 90 | 76 | 87 |
| Asset 4 | 75 | 79 | 85 | 81 |

Notably, the data for each asset may correspond to different 10-day-long windows. For example, the data for Asset 1 may correspond to the $1^{st}$ through the $10^{th}$ of January 2016, the data for Asset 2 may correspond to the $3^{rd}$ through $12^{th}$ of January 2016, the data for Asset 3 may correspond to 10 days from May 2016, and the data for Asset 4 may correspond to 10 days from July 2017. In this way, the asset data platform 102 may advantageously leverage data from assets that have been in service (e.g., in operation out in the field) for different lengths of time, which allows the platform to compare relatively "young" assets to "older" assets, and avoids wasting available data that may result if the asset data platform 102 were to limit its evaluation to specific windows of time (e.g., specific calendar dates that overlap for all assets).

From the aggregated data for the assets in the fleet, the asset data platform 102 may determine a fleet-wide count distribution of the operating data points generated by the fleet and received by the asset data platform 102. In example embodiments, the fleet-wide count distribution may be based on a representative metric, such as median, mean, or mode values from the operating data point counts. For example, for each asset in the fleet, the asset data platform 102 may determine the mean count of operating data points from the particular asset on the 7-day basis. For instance, referring back to Table 1, the asset data platform 102 may determine, for Asset 1, a mean count of 73. The asset data platform 102 may then define a fleet-wide count distribution from the determined mean values for the fleet of assets.

The asset data platform 102 may then utilize the defined fleet-wide count distribution, along with certain sparsity criteria, to determine whether the transmissions of operating data that it received from the given asset qualify as "sparse" communications. In practice, the sparsity criteria used may depend on the particular implementation, two examples of which follow but are not meant to be limiting.

In one example embodiment, the asset data platform 102 may determine, from aggregated data for the given asset (e.g., "rolled up" data), a count of operating data points received from the given asset that reflect the same representative metric that was used to define the fleet-wide count distribution. For example, the asset data platform 102 may determine the mean count of operating data points it received from the given asset on the 7-day basis. If that number is below a threshold number of received operating data points, then the given asset may be designated as "sparsely" communicating. In example embodiments, the threshold number of data points may be defined based on an evaluation of the amount of operating data points that the asset data platform 102 received from the fleet as a whole. For instance, continuing with the above example, if the mean value for the given asset is in the lower end of the fleet-wide count distribution (e.g., the fifth percentile), the given asset is designated as "sparsely" communicating.

In another example embodiment, the asset data platform 102 may determine how often the count of operating data points received from the given asset, perhaps on a certain aggregate basis, falls below a threshold number of received operating data points. For example, the asset data platform 102 may determine how often the count of operating data points that it received on a 7-day basis from the given asset is on the lower end of the fleet-wide count distribution (e.g., the fifth percentile). Returning to Table 1, the asset data platform 102 may compare the given asset's Days 1-7 count against the fleet-wide count distribution, the given asset's Days 2-8 count against the fleet-wide count distribution, and so forth. Based on these comparisons, the asset data platform 102 may determine what percentage of the given asset's 7-day counts falls into the lower end of the fleet-wide count distribution, and if that percentage is at or above a threshold percentage (e.g., 15%), then the given asset is designated as "sparsely" communicating. In yet other example embodiments, the given asset is designated as "sparsely" communicating if either of the two-aforementioned example sparsity criterion are met. Other examples are also possible.

In some example embodiments, the asset data platform 102 may be configured to identify sparse communications as it receives (or fails to receive) data from assets, which it may do in a variety of manners. For example, one or more of the functions described with reference to block 604B may be adapted for real-time or near real-time sparse communication identification. For instance, as the asset data platform 102 receives new transmissions of operating data from assets, the asset data platform may "roll up" that data as part of the next contiguous window. As an example, continuing with the above illustrative example, a new transmission of operating data from Asset 1 may correspond to day 11, and so, operating data generated by Asset 1 over Days 5-11 may be "rolled up." The asset data platform 102 may update the fleet-wide count distribution based on newly "rolled up" data and compare a given asset's new transmission of operating data against that updated distribution to determine whether the given asset is "sparsely" communicating. Other examples of identifying sparse communication are also possible.

Returning to FIG. 6, at block 604C, the asset data platform 102 may analyze transmissions of operating data points received from the given asset to determine whether the given asset was communicating in a "delayed" manner, which the asset data platform 102 may use as yet another basis for inferring that the given asset was non-communicative. More specifically, as discussed above in relation to block 602, each given operating data point may include a timestamp or the like indicating when the given asset generated the operating data point (i.e., "generation" time), and when the asset data platform 102 receives a given transmission of operating data (that may include one or multiple operating data points), the asset data platform 102 assigns a timestamp or the like indicating when the asset data platform first acknowledged the operating data points from that transmission (i.e., the "acknowledgment" time). In general, the asset data platform 102 may determine whether the given asset was communicating in a "delayed" manner based on these generation and acknowledgment times.

Figure 7C:
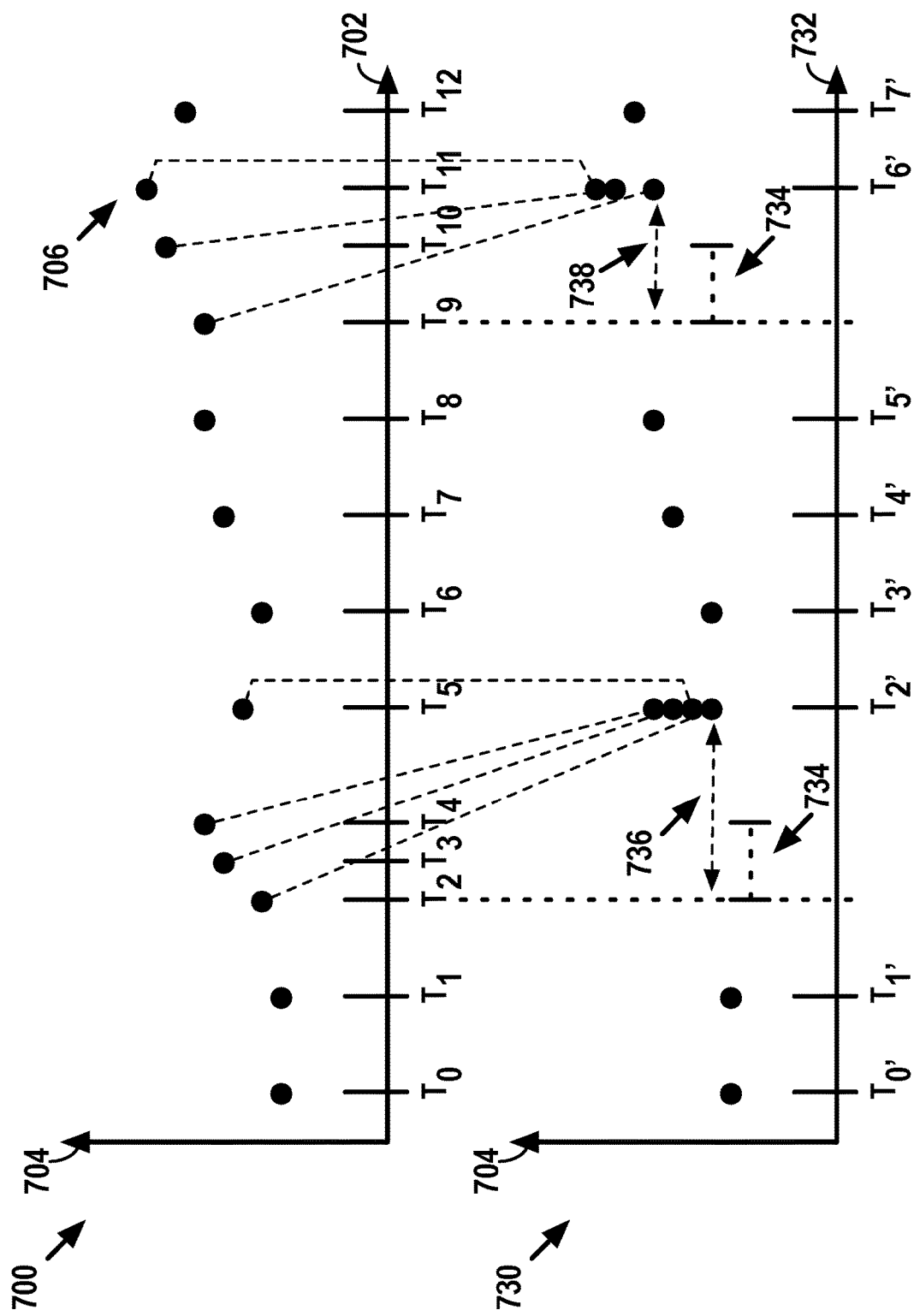
FIG. 7C depicts a conceptual illustration of examples of delayed data.

To illustrate, FIG. 7C provides a conceptual illustration of examples of delayed data. In particular, FIG. 7C shows data plot 700 representing operating data points that are generated by the given asset over time (from FIG. 7A) and data plot 730 representing operating data points that the asset data platform 102 received from the given asset. Data plot 730 differs from data plots 700, 710, and 720 in that the time axis 732 represents the time when the asset data platform 102 acknowledged the corresponding operating data points received from the given asset (i.e., "$T_{0'}$"-"$T_{7'}$" are acknowledgment times). As shown, at acknowledgment time $T_{2'}$, the asset data platform 102 acknowledged a transmission from the given asset that included four operating data points corresponding to the four operating data points generated by the given asset at generation times $T_2$-$T_5$. The dashed connecting lines represent the relationship between the operating data points generated at the given asset and the operating data points acknowledged by the asset data platform 102. Similarly, at acknowledgment time $T_{6'}$, the asset data platform 102 acknowledged a transmission from the given asset that included three operating data points corresponding to the three operating data points generated by the given asset at generation times $T_9$-$T_{11}$. The asset data platform 102 may utilize the time that elapsed between the generation and acknowledgment times of the operating data to determine whether the given asset is communicating in a "delayed" manner.

More specifically, in example embodiments, the asset data platform 102 may first determine whether the difference between the generation time and the acknowledgment time of an operating data point exceeds a threshold length of delay (e.g., 12 hours). If so, the asset data platform 102 may flag the given operating data point as being delayed. Depending on the implementation, the asset data platform 102 may also flag the given transmission that included the given operating data point as being delayed. As mentioned before, in example embodiments, assets may be configured to generate multiple operating data points at the same time and include those data points in a single transmission to the asset data platform 102. In such a case, a transmission as a whole would be flagged as being delayed based on a determination that a single operating data point included therein was flagged as being delayed.

In other embodiments, assets may include in a single transmission multiple operating data points that may have different generation times and so, the asset data platform 102 may be configured to flag a given transmission of operating data as being delayed in a variety of different manners. In some implementations, this function may involve the asset data platform 102 flagging a given transmission as being delayed if (i) any single operating data point from that given transmission could individually be considered delayed, (ii) a majority of the operating data points could individually be considered delayed, or (iii) some other amount of operating data points from the given transmission could individually be considered delayed. Other examples of designating a transmission having multiple operating data points as being delayed are also possible.

To illustrate, returning to FIG. 7C, each of the transmissions received by the asset data platform 102 at acknowledgment times $T_{2'}$ and $T_{6'}$ is considered delayed because at least one operating data point from each transmission was acknowledged over a threshold length of time 734 after the operating data point was generated by the given asset. For instance, the time that elapsed 736 between the acknowledgment time $T_{2'}$ and the generation time $T_2$ is greater than the threshold length of time 734, and the time that elapsed 738 between the acknowledgment time $T_{6'}$ and the generation time $T_9$ is greater than the threshold length of time 734.

In example embodiments, after identifying the delayed transmissions of operating data from the given asset, the asset data platform 102 may then determine how many of the given asset's transmissions were delayed over a given window of time. If the number of delayed transmissions exceeds a threshold number of delayed transmissions (e.g., above 5% or 10% of received transmission of operating data from the given asset over the given window of time), then the given asset is designated as "delayed."

In some example embodiments, the asset data platform 102 may be configured to identify delayed communications as it receives (or fails to received) data from assets. For example, one or more of the functions described with reference to block 604C may be adapted for real-time or near real-time delayed communication identification. Other examples are also possible.

Returning to FIG. 6, in example embodiments, the asset data platform 102 may be configured to transition from block 604 to block 606 in a variety of manners. For example, the asset data platform 102 may be configured to perform any one or more of the techniques of blocks 604A, 604B, or 604C, and if configured to perform multiple of these techniques, the asset data platform 102 may perform each of the multiple techniques in order until a communication abnormality is identified for the given asset or it may perform each of the multiple techniques, perhaps identifying multiple different types of communication abnormalities. In some example embodiments, if the asset data platform 102 fails to designate the given asset in accordance with any of the blocks 604A, 604B, or 604C, then the asset data platform may discontinue performing the functions 600 of FIG. 6.

At block 606, in example embodiments, the asset data platform 102 may designate the given asset as having been in a non-communicative state if the given asset has been designated as (i) having an unexplained data gap (i.e., as a result of block 604A), (ii) sparsely communicating (i.e., as a result of block 604B), or (iii) communicating in a delayed manner (i.e., as a result of block 604C). That is, in response to the asset data platform 102 detecting at least some sort of communication abnormality between the given asset and the asset data platform 102, the asset data platform 102 may designate the given asset as non-communicative.

In example embodiments, the asset data platform 102 may additionally or alternatively be configured to utilize other techniques for designating assets as having been in a non-communicative state. For example, in general, the asset data platform 102 may be configured to utilize a machine learning anomaly detection technique that may generally involve applying one or more machine learning methods to received transmissions of operating data from assets, utilizing a set of rules to identify communication abnormalities, and then assigning a probability or the like indicative of whether a given asset is in a non-communicative state.

In some cases, the set of rules may take the form of or otherwise utilize one or more decision trees, kernels, support vector machines or other kernel members, and the like. In practice, the asset data platform 102 may be configured to automatically define the set of rules as a result of leveraging machine learning techniques, such as unsupervised or supervised learning techniques.

For example, an unsupervised learning technique may define rules for identifying communication abnormalities based on comparing one or more features of an asset's present, or most recent, transmissions of operating data to a baseline representative of the asset's typical transmission behavior and the features thereof. The one or more features may include the rate at which the asset makes transmissions, the rate at which certain types of operating data are sent, ratios of the types of operating data that are sent, and so forth. The rules may then be defined based on features that are indicative of a communication abnormality.

As another example, a supervised learning technique may define rules for identifying communication abnormalities based on known instances of an asset in a non-communicative state and known instances of the asset in a communicative state. From a comparison of the asset's transmission behaviors in each of these states, the asset data platform 102 may then define the set of rules. Other examples are also possible.

At block 608, the asset data platform 102 may handle transmissions of operating data from the given asset in accordance with the non-communicative designation. That is, while the given asset is designated a non-communicative asset, the asset data platform 102 may be configured to modify the manner in which it typically receives, processes, and/or analyzes transmissions of operating data from the given asset. In practice, handling transmissions of operating data in accordance with the non-communicative designation may be performed in a variety of manners.

In example embodiments, this operation may involve the asset data platform 102 suspending the performance of data analytics for the given asset. More specifically, prior to the given asset being designated non-communicative, the asset data platform 102 may perform data analytics for the given asset based at least on operating data points from the given asset. For example, the asset data platform 102 may define, modify, and/or execute one or more predictive models (e.g., one or more failure models) on behalf of the given asset based on operating data points from the given asset. For more detail regarding an asset data platform performing data analytics on behalf of a given asset, please refer to U.S. application Ser. No. 14/732,258, which is incorporated by reference herein in its entirety.

While the given asset is designated non-communicative, the asset data platform 102 may forgo performing data analytics for the given asset based on operating data from the given asset. For example, the asset data platform 102 may stop defining, modifying, and/or executing one or more predictive models for the given asset based on operating data points from the given asset. In some cases, while the asset data platform 102 may suspend performance of data analytics for the given asset that is based on operating data points from the given asset, the asset data platform 102 may continue to perform other data analytics for the given asset that are not dependent on operating data points that are communicated from the given asset to the asset data platform 102. Other scenarios are also possible.

As another example, the asset data platform 102 handling transmissions of operating data from the given asset in accordance with the non-communicative designation may involve the asset data platform 102 receiving operating data points from the given asset but isolating the operating data points to a particular location within the asset data platform 102 without performing analytics on the data. In example embodiments, the particular location in the asset data platform 102 may be particular data storage that stores operating data points that are not used by the asset data platform 102 to perform data analytics for the given asset. For example, the asset data platform 102 may store the operating data points in data storage that is specific for data from non-communicative assets that may be analyzed at some future date, such as to help identify causes of non-communicative assets, among other examples.

As yet another example, the asset data platform 102 handling transmissions of operating data from the given asset in accordance with the non-communicative designation may involve the asset data platform 102 suspending performance of data analytics for one or more other assets (i.e., that are not the given asset) based on the operating data points from the given asset. In particular, prior to the given asset being designated non-communicative, the asset data platform 102 may perform data analytics for one or more other assets (e.g., other assets within the given asset's fleet) based at least on operating data points from the given asset. For example, the asset data platform 102 may define and/or modify one or more predictive models (e.g., one or more failure models) for another asset based at least in part on operating data points from the given asset. For more detail regarding an asset data platform defining and/or modifying predictive models for assets, please refer to U.S. application Ser. No. 14/744,352, which is incorporated by reference herein in its entirety. While the given asset is designated non-communicative, the asset data platform 102 may forgo utilizing operating data points from the given asset for purposes of data analytics for other assets. For example, the asset data platform 102 may stop defining and/or modifying predictive models for other assets based on operating data points from the given asset.

In yet a further example, the asset data platform 102 handling transmissions of operating data from the given asset in accordance with the non-communicative designation may involve the asset data platform 102 making the operating data points from the given asset unavailable as a source of "training data" for predictive models. For instance, the asset data platform 102 may be configured to define predictive models and then train the models based on a set of "training data." While the given asset is designated non-communicative, the asset data platform may exclude the operating data points from the given asset from any training data. Additionally or alternatively, in instances where the asset data platform 102 had previously trained a predictive model based on operating data points from the given asset that correspond to times in which the given asset was non-communicative, after determining that the given asset was non-communicative, the asset data platform 102 may re-train the predictive model with training data that excludes those operating data points from the given asset.

Other examples of handling transmissions of operating data in accordance with the non-communicative designation are also possible. In some example embodiments, how the asset data platform 102 handles transmissions of operating data from a non-communicative asset may depend on the type of communication abnormality that the asset data platform 102 identified that caused it to designate the asset as non-communicative in the first place. For example, a non-communicative state that arises from a data gap might be handled differently from a non-communicative state that arises from sparse communication, while a non-communicative state that arises from sparse communication might be handled differently from a non-communicative state that arises from delayed operating data points, among other examples.

In any event, there may be several benefits in the asset data platform 102 handling transmissions of operating data from the given asset in accordance with the non-communicative designation. For example, the asset data platform 102's data analysis for an asset is generally most accurate when the platform has the most complete knowledge of the actual operation of the asset as possible. Accordingly, if the asset data platform 102 performs data analytics for a non-communicative asset, the asset data platform 102 would be doing so without a complete dataset (i.e., the asset data platform 102 may be acting on data that does not reflect the complete picture of how the asset is actually operating in the field), which may result in unproductive and/or inaccurate data analytics. This could in turn result in the asset data platform 102 making inaccurate failure predictions, as one example, which could then result in a failure at the asset sooner than expected, perhaps while the asset is out in the field performing some task.

As another example, certain analytics performed by the asset data platform 102 is most advantageous when the data analytics is performed in real-time or near real-time, such as when the asset data platform 102 is making asset failure predictions. Accordingly, if the asset data platform 102 performs such analytics for a non-communicative asset (e.g., an asset that is communicating in a "delayed" manner), the results of those analytics may not be as useful (and thus potentially a waste of computing resources) because, by the time that the results of the analytics are available, the asset's operating conditions may have changed.

Another example benefit of the asset data platform 102 handling transmissions of operating data from the given asset in accordance with the non-communicative designation is that the asset data platform could conserve computing resources. More specifically, while an asset is designated non-communicative, the asset data platform 102 may no longer perform the complete set of operations that it normally would perform for that asset (e.g., receiving, processing, and analyzing data from that asset) and/or no longer perform operations for that asset to the full extent as it normally would. Thus, the asset data platform 102 may preserve computing resources while an asset is designated non-communicative because performing operations as normal for a non-communicative asset would likely result in inaccurate and/or unproductive data analyses, as discussed above. Moreover, by reducing the computing resources devoted to non-communicative assets, the asset data platform 102 may instead expend those computing resources on other more beneficial and/or productive operations, such as data analytics for assets that are communicating normally (i.e., in a communicative state). Other benefits are also possible.

In some example embodiments, the asset data platform 102 may be configured to determine the causes of assets entering a non-communicative state. For instance, the asset data platform 102 may be configured to identify geographical areas that are correlated with communication abnormalities (i.e., "non-communicative areas"). In example implementations of such embodiments, a given transmission of operating data from a given asset may include location data (e.g., GPS coordinates or some other indication of geographical location) identifying the location of the given asset when it transmitted the operating data to the asset data platform. Additionally or alternatively, a given operating data point may also include location data identifying the location of the given asset when it generated the given operating data. The asset data platform 102 may utilize transmission and/or operating-data-point generation location data that correspond to instances of non-communicative assets to help determine the causes of assets entering the non-communicative state.

More specifically, the asset data platform 102 may identify, perhaps from a particular window of time, the past instances of communication abnormalities for the fleet of assets. For example, the asset data platform 102 may leverage its analysis from performing the functions described with reference to block 604 of FIG. 6. For each of the identified instances of communication abnormalities, the asset data platform 102 may identify location data related to a transmission or operating data point that is associated with the given identified instance of a communication abnormality. For example, if the given identified instance of a communication abnormality was a data gap for a given asset, the asset data platform 102 may identify the location data of the last transmission of operating data that the asset data platform 102 received from the given asset prior to the data gap. As another example, if the given identified instance of a communication abnormality was a delayed operating data point from a given asset, the asset data platform 102 may identify the location data of the delayed operating data point indicating the location of the given asset when it generated the given operating data. Other examples are also possible.

In any event, the asset data platform 102 may aggregate the location data associated with the instances of communication abnormalities and evaluate this aggregated location data to determine whether there are geographical areas that are correlated with communication abnormalities. For instance, the asset data platform 102 may plot the location data on a map (e.g., of the United States) and evaluate the concentration of data points on the map. Areas of high concentrations of data points (i.e., areas with more than a threshold amount of data points within a certain radius) may then be deemed to be non-communicative areas.

In example embodiments, the asset data platform 102 may utilize its determination of any non-communicative areas in a variety of manners. For example, in some embodiments, the asset data platform 102 may cause one or more assets to suspend attempting to transmit operating data to the asset data platform 102 when the one or more assets are located within one of the non-communicative areas. In particular, the asset data platform 102 may transmit a message instructing the one or more assets of the non-communicative areas. Thereafter, each asset may monitor its location (e.g., using its position unit) and if an asset enters a non-communicative area, it may then stop sending operating data to the asset data platform.

As another example, in some embodiments, the asset data platform 102 may filter incoming transmissions of operating data based on the determined non-communicative areas. For example, when the asset data platform 102 receives a transmission of operating data from a particular asset, it may compare the location data of the transmission and/or of operating data points within that transmission to the determined non-communicative areas. If the location data corresponds to a location within a non-communicative area, the asset data platform 102 may handle the received transmission of operating data from the particular asset in line with how it handles data from assets that are designated non-communicative (e.g., in line with block 608 of FIG. 6). That is, the asset data platform 102 may be able to handle the received transmission of operating data from the particular asset as if the particular asset was designated non-communicative without the asset data platform 102 necessarily having to perform all of the functions 600 of FIG. 6 in the first instance for that asset. Other examples of the asset data platform 102 determining the causes of assets entering a non-communicative state and utilizing that determination are also possible.

In example embodiments, the asset data platform 102 may be configured to utilize the data for non-communicative assets to identify systemic (e.g., fleet-wide) conditions that are affecting communications between assets and the asset data platform 102. For example, based on the data for non-communicative assets, the asset data platform 102 may be configured to identify disruptive conditions that affect multiple assets in a similar manner, such as environmental conditions and/or geographical locations.

Moreover, the asset data platform 102 may be configured to trigger an alert or a remedial action and/or implement further investigative techniques if the asset data platform 102 identifies certain disruptive conditions. For example, if the data for non-communicative assets indicates that multiple assets enter that state around the same time period, this could be an indicator of a relatively severe condition, such as a software failure that affects multiple assets running the same on-board computers, an on-asset component or environmental condition that produces interference that affects communication between the assets and the asset data platform 102, and an error occurring at the asset data platform 102, among other examples. If the asset data platform 102 identifies such a disruptive condition, the asset data platform 102 may be configured to responsively perform an action to help facilitate diagnosing and/or remedying the disruptive condition.

V. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

What is claimed is:

1. A computing system comprising:
a network interface configured to facilitate communications over a communication network with a plurality of assets;
at least one processor;
a non-transitory computer-readable medium; and
program instructions stored on the non-transitory computer-readable medium that are executable by the at least one processor to cause the computing system to:
receive, via the network interface, a plurality of operating data points from a given asset of the plurality of assets, wherein the received operating data points are indicative of operation of the given asset;
based on at least one of the received operating data points, detect a communication abnormality at the given asset, wherein detecting the communication abnormality at the given asset comprises at least one of:
determining that there has been a gap in the received operating data points that exceeds a threshold gap time and that the computing system is unable to identify any event occurring at the given asset that explains the gap in the received operating data points;
determining that an amount of operating data points received from the given asset over a given amount of time is abnormally low as compared to an amount of operating data points received from other assets in the plurality of assets over the given amount of time; or
determining that a number of delayed operating data points received from the given asset exceeds a threshold number of delayed operating data points;
in response to detecting the communication abnormality, designate the given asset as being non-communicative; and
handle operating data points received from the given asset in accordance with the non-communicative designation.

2. The computing system of claim 1, wherein determining that there has been a gap in the received operating data points that exceeds the threshold gap time and that the computing system is unable to identify any event occurring at the given asset that explains the gap in the received operating data points comprises:
based on at least one of the received operating data points, identifying a period of time exceeding the threshold gap time in which the computing system lacks any operating data points from the given asset, wherein the period of time comprises the gap; and
evaluating asset-related data indicating events occurring at the given asset from within the identified period of time and thereby determining that the computing system is unable to identify any event occurring at the given asset that explains the gap in the received operating data points.

3. The computing system of claim 1, wherein determining that the computing system is unable to identify any event occurring at the given asset that explains the gap in the received operating data points comprises determining that the computing system is unable to identify either of a maintenance event for the given asset or a repair event for the given asset that explains the gap in the received operating data points.

4. The computing system of claim 1, wherein determining that the amount of operating data points received from the given asset over the given amount of time is abnormally low as compared to the amount of operating data points received from the other assets in the plurality of assets over the given amount of time comprises:
evaluating a respective amount of operating data points received from each asset of the plurality of assets over one or more periods of time that are equivalent to the length of the given amount of time to define a threshold amount of operating data points that is reflective of a minimum amount of operating data points received from an asset in a communicative state; and
determining that the amount of operating data points received from the given asset over the given amount of time is below the threshold amount of operating data points.

5. The computing system of claim 1, wherein any given operating data point comprises a generation time corresponding to when the given asset generated the given operating data point, and wherein receiving the plurality of operating data points from the given asset comprises, for any given operating data point, assigning an acknowledgment time indicative of when the computing system first acknowledged the given operating data point.

6. The computing system of claim 5, wherein a delayed operating data point comprises an operating data point for which a time difference between a generation time and an acknowledgment time exceeds a threshold delay time.

7. The computing system of claim 1, wherein the program instructions stored on the non-transitory computer-readable medium further comprise program instructions stored on the non-transitory computer-readable medium that are executable by the at least one processor to cause the computing system to, prior to the non-communicative designation, perform data analytics for the given asset based on operating data points received from the given asset, and wherein handling operating data points received from the given asset in accordance with the non-communicative designation comprises suspending the performance of the data analytics for the given asset based on operating data points received from the given asset.

8. The computing system of claim 7, wherein performing the data analytics for the given asset comprises executing a predictive model for the given asset based on operating data points received from the given asset, and wherein suspending the performance of the data analytics for the given asset comprises suspending the execution of the predictive model for the given asset.

9. The computing system of claim 7, wherein performing the data analytics for the given asset comprises one of defining or modifying a predictive model for the given asset based on operating data points received from the given asset, and wherein suspending the performance of the data analytics for the given asset comprises suspending the one of defining or modifying the predictive model for the given asset.

10. The computing system of claim 1, wherein the program instructions stored on the non-transitory computer-readable medium further comprise program instructions stored on the non-transitory computer-readable medium that are executable by the at least one processor to cause the computing system to, prior to the non-communicative designation, train a predictive model based at least on operating data points received from the given asset, and wherein handling the operating data points received from the given asset in accordance with the non-communicative designation comprises at least one of (i) excluding operating data points received from the given asset from the training of any predictive model or (ii) re-training the predictive model based on operating data that excludes the operating data points received from the given asset.

11. A computer-implemented method comprising:
receiving, via a network interface, a plurality of operating data points from a given asset of a plurality of assets, wherein the received operating data points are indicative of operation of the given asset;
based on at least one of the received operating data points, detecting a communication abnormality at the given asset, wherein detecting the communication abnormality at the given asset comprises at least one of:
determining that there has been a gap in the received operating data points that exceeds a threshold gap time and that the computing system is unable to identify any event occurring at the given asset that explains the gap in the received operating data points;
determining that an amount of operating data points received from the given asset over a given amount of time is abnormally low as compared to an amount of operating data points received from other assets in the plurality of assets over the given amount of time; or
determining that a number of delayed operating data points received from the given asset exceeds a threshold number of delayed operating data points;
in response to detecting the communication abnormality, designating the given asset as being non-communicative; and
handling operating data points received from the given asset in accordance with the non-communicative designation.

12. The computer-implemented method of claim 11, wherein determining that there has been a gap in the received operating data points that exceeds the threshold gap time and that the computing system is unable to identify any event occurring at the given asset that explains the gap in the operating data points comprises:
based on at least one of the received operating data points, identifying a period of time exceeding the threshold gap time in which the computing system lacks any operating data points from the given asset, wherein the period of time comprises the gap; and
evaluating asset-related data indicating events occurring at the given asset from within the identified period of time and thereby determining that the computing system is unable to identify any event occurring at the given asset that explains the gap in the received operating data points.

13. The computer-implemented method of claim 11, wherein determining that the amount of operating data points received from the given asset over the given amount of time is abnormally low as compared to the amount of operating data points received from the other assets in the plurality of assets over the given amount of time comprises:
evaluating a respective amount of operating data points received from each asset of the plurality of assets over one or more periods of time that are equivalent to the length of the given amount of time to define a threshold amount of operating data points that is reflective of a minimum amount of operating data points received from an asset in a communicative state; and
determining that the amount of operating data points received from the given asset over the given amount of time is below the threshold amount of operating data points.

14. The computer-implemented method of claim 11, wherein any given operating data point comprises a generation time corresponding to when the given asset generated the given operating data point, wherein receiving the plurality of operating data points from the given asset comprises, for any given operating data point, assigning an acknowledgment time indicative of when the computing system first acknowledged the given operating data point, and wherein a delayed operating data point comprises an operating data point for which a time difference between a generation time and an acknowledgment time exceeds a threshold delay time.

15. The computer-implemented method of claim 11, further comprising, prior to the non-communicative designation, performing data analytics for the given asset based on operating data points received from the given asset, and wherein handling operating data points received from the given asset in accordance with the non-communicative designation comprises suspending the performance of the data analytics for the given asset based on operating data points received from the given asset.

16. The computer-implemented method of claim 15, wherein performing the data analytics for the given asset comprises executing a predictive model for the given asset based on operating data points received from the given asset, and wherein suspending the performance of the data analytics for the given asset comprises suspending the execution of the predictive model for the given asset.

17. The computer-implemented method of claim 15, wherein performing the data analytics for the given asset comprises one of defining or modifying a predictive model for the given asset based on operating data points received from the given asset, and wherein suspending the performance of the data analytics for the given asset comprises suspending the one of defining or modifying the predictive model for the given asset.

18. The computer-implemented method of claim 11, further comprising, prior to the non-communicative designation, training a predictive model based at least on operating data points received from the given asset, and wherein handling the operating data points received from the given asset in accordance with the non-communicative designation comprises at least one of (i) excluding operating data points received from the given asset from the training of any predictive model or (ii) re-training the predictive model based on operating data that excludes the operating data points received from the given asset.

19. A non-transitory computer-readable medium comprising programs instructions stored thereon that are executable to cause a computing system to:
receive a plurality of operating data points from a given asset of a plurality of assets, wherein the received operating data points are indicative of operation of the given asset;
based on at least one of the received operating data points, detect a communication abnormality at the given asset, wherein detecting the communication abnormality at the given asset comprises at least one of:
determining that there has been a gap in the received operating data points that exceeds a threshold gap time and that the computing system is unable to identify any event occurring at the given asset that explains the gap in the received operating data points;

determining that an amount of operating data points received from the given asset over a given amount of time is abnormally low as compared to an amount of operating data points received from other assets in the plurality of assets over the given amount of time; or determining that a number of delayed operating data points received from the given asset exceeds a threshold number of delayed operating data points;

in response to detecting the communication abnormality, designate the given asset as being non-communicative; and handle operating data points received from the given asset in accordance with the non-communicative designation.

20. The non-transitory computer-readable medium of claim 19, wherein determining that there has been a gap in the received operating data points that exceeds the threshold gap time and that the computing system is unable to identify any event occurring at the given asset that explains the gap in the operating data points comprises:

based on at least one of the received operating data points, identifying a period of time exceeding the threshold gap time in which the computing system lacks any operating data points from the given asset, wherein the period of time comprises the gap; and evaluating asset-related data indicating events occurring at the given asset from within the identified period of time and thereby determining that the computing system is unable to identify any event occurring at the given asset that explains the gap in the received operating data points.

* * * * *